United States Patent [19]

Umeda

[11] Patent Number: 4,757,408
[45] Date of Patent: Jul. 12, 1988

[54] MAGNETIC RECORDING AND/OR REPRODUCING APPARATUS

[75] Inventor: Hiroyuki Umeda, Yokohama, Japan

[73] Assignee: Victor Company of Japan, Ltd., Japan

[21] Appl. No.: 866,150

[22] Filed: May 21, 1986

[30] Foreign Application Priority Data

May 23, 1985 [JP] Japan .................................. 60-76838

[51] Int. Cl.⁴ ........................ G11B 15/14; G11B 27/02
[52] U.S. Cl. ......................................... 360/64; 360/14.1
[58] Field of Search ............................. 360/64, 66, 14.1

[56] References Cited

U.S. PATENT DOCUMENTS 4,520,405 5/1985 Sasaki et al. ...................... 360/14.1

FOREIGN PATENT DOCUMENTS 54-1010 1/1979 Japan .
56-107331 8/1981 Japan .

Primary Examiner—Vincent P. Canney
Attorney, Agent, or Firm—Andrus, Sceales, Starke & Sawall

[57] ABSTRACT

A helical scan type magnetic recording and/or reproducing apparatus comprises a rotary erase head mounted on a rotary drum at such a position that in a normal recording mode the rotary erase head does not erase a portion of a track formed on a magnetic tape by a rotary recording and/or reproducing head which leads the rotary erase head and in a long-time recording mode the rotary erase head erases an overlapping portion of two mutually adjacent tracks formed by a pair of rotary recording and/or reproducing heads respectively leading and lagging the rotary erase head.

4 Claims, 2 Drawing Sheets

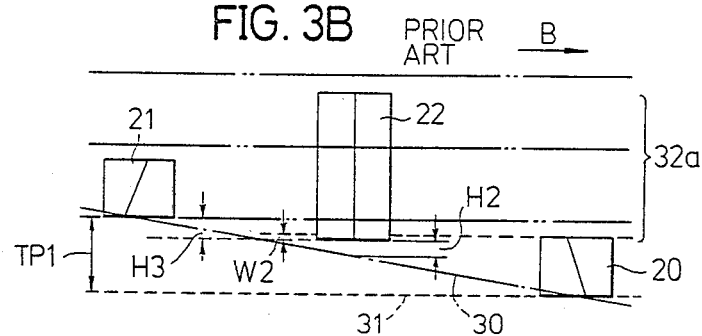
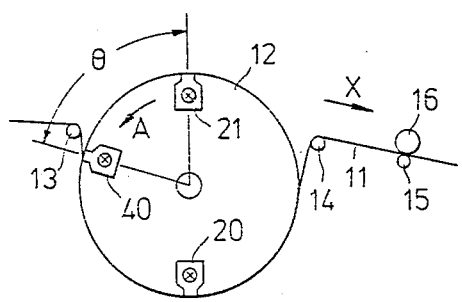
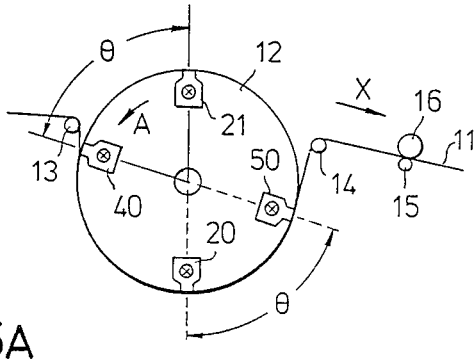
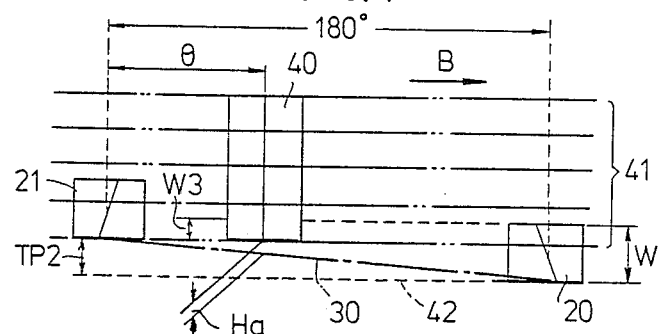
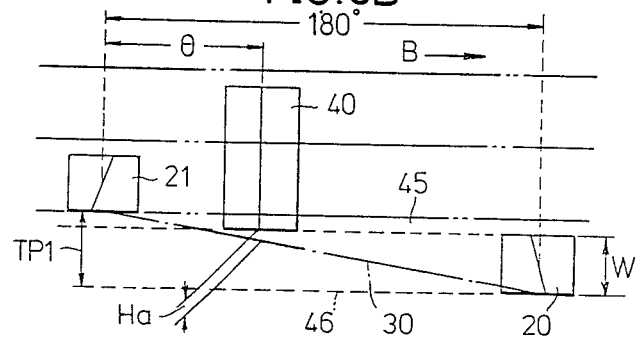

MAGNETIC RECORDING AND/OR REPRODUCING APPARATUS

BACKGROUND OF THE INVENTION

The present invention generally relates to magnetic recording and/or reproducing apparatuses, and more particularly to a helical scan type magnetic recording and/or reproducing apparatus comprising a rotary drum which is mounted with rotary magnetic heads and a rotary erase head and is wrapped obliquely with a magnetic tape on an outer peripheral surface therof.

Presently, there are various types of helical scan type magnetic recording and/or reproducing apparatuses (hereinafter referred to as a video tape recorder or simply VTR) which record and/or reproduce signals on and/or from a magnetic tape. The VTR comprises a guide drum having a stationary drum and a rotary drum mounted with rotary magnetic heads, and the tape is wrapped obliquely around an outer peripheral surface of the guide drum for a predetermined angular range. The signals are recorded and/or reproduced on and/or from tracks on the moving tape by the rotary magnetic heads, where the tracks on the tape are formed obliquely to a longitudinal direction of the tape. As is well known, there are VTRs designed to operate in a normal speed mode and a long-time mode in which the tape is transported at a speed lower than that at the time of a normal speed mode so that the recording or reproduction can be carried out for a longer time by a given length of tape. Furthermore, there are VTRs having an editing function so that a new information can be inserted to replace an old information on a pre-recorded tape.

The VTR comprises a stationary full-width erase head which erases pre-recorded signals on the tape for the full width thereof. However, when carrying out an editing operation, the full-width erase cannot be used because the full-width erase head will erase portions on the pre-recorded tape which should not be erased. For this reason, a rotary erase head is provided on the rotary drum of the VTR having the editing function. When carrying out the editing operation, the rotary erase head scans the tracks to erase the pre-recorded old information therefrom and the following rotary magnetic head scans the erased track to record the new information thereon.

However, a track pitch of the tracks formed on the tape is different for the case where the tape is recorded in the normal speed mode and for the case where the tape is recorded in the long-time mode. In an example of a conventional VTR, the rotary erase head is mounted at a position equidistant from a pair of mutually confronting rotary magnetic heads on the rotary drum in a plan view of the rotary drum. Hence, in the case where the rotary erase head is mounted at a first height position so that it is possible to satisfactorily erase the information pre-recorded on certain tracks on the tape during the editing operation carried out in the normal speed mode of the VTR, it is possible to prevent the rotary erase head from scanning those tracks pre-recorded with information which should not be erased. However, when the diting operation is carried out in the long-time mode with the rotary erase head mounted at the first height position, the rotary erase head will erase a portion of a track which is pre-recorded with the information which should not be erased. On the other hand, in the case where the rotary erase head is mounted at a second height position so that it is possible to satisfactorily erase the information pre-recorded on certain tracks on the tape during the editing operation carried out in the long-time mode of the VTR, it is possible to prevent the rotary erase head from scanning those tracks pre-recorded with information which should not be erased. However, when the editing operation is carried out in the normal speed mode with the rotary erase head mounted at the second height position, the rotary erase head will erase a portion of a track which is pre-recorded with the information which should not be erased. For this reason, as will be described later on in the specification in conjunction with drawings, according to the conventional VTR, it is impossible to satisfactorily erase the pre-recorded information by the rotary erase head during the editing operation carried out in both the normal speed mode and the long-time mode.

It is possible to conceive such an arrangement that the height position of the rotary erase head is changed depending on the mode in which the editing operation is carried out, but this arrangement will suffer disadvantages such as complex construction and high cost.

SUMMARY OF THE INVENTION

Accordingly, it is a general object of the present invention to provide a novel and useful helical scan type magnetic recording and/or reproducing apparatus in which the disadvantages described heretofore are eliminated.

Another and more specific object of the present invention is to provide a helical scan type magnetic recording and/or reproducing apparatus in which a mounting position of a rotary erase head on a rotary drum is set depending on track pitches in track patterns formed during various modes of the apparatus and on widths of rotary recording and/or reproducing heads. According to the apparatus of the present invention, it is possible to satisfactorily erase pre-recorded information on a magnetic tape regardless of the mode of the apparatus, and it is possible to prevent the rotary erase head from scanning thoe tracks pre-recorded with information which should not be erased.

Still another object of the present invention is to provide a helical scan type magnetic recording and/or reproducing apparatus in which a rotary erase head is mounted on a rotary drum at such a position that in a normal recording mode the rotary erase head does not erase a portion of a track formed on a magnetic tape by a rotary recording and/or reproducing head which leads the rotary erase head and in a long-time recording mode the rotary erase head erases an overlapping portion of two mutually adjacent tracks formed by a pair of rotary recording and/or reproducing heads respectively leading and lagging the rotary erase head. The long-time recording mode is a mode in which the magnetic tape is transported at a speed which is slower than that at the time of the normal recording mode, and the overlapping portion is formed as the rotary recording and/or reproducing head lagging the rotary erase head scans the magnetic tape while overlapping a portion of the track pre-recorded by the rotary recording and/or reproducing head leading the rotary erase head. According to the apparatus of the present invention, it is possible to positively prevent the rotary erase head from scanning those tracks pre-recorded with information which should not be erased, regardless of the mode with which the editing operation is carried out.

Other objects and further features of the present invention will be apparent from the following detailed description when read in conjunction with the accompanying drawings.

BRIEF DESCRIPTION OF THE DRAWINGS

FIGS. 3A and 3B respectively are diagrams for explaining the operation of the rotary erase head of the apparatus shown in FIG. 1 in the normal and long-time modes when the rotary erase head is mounted at a position suited for erasure in the long-time mode;

FIG. 4 is a plan view showing an essential part of a first embodiment of the helical scan type magnetic recording and/or reproducing apparatus according to the present invention;

FIGS. 5A and 5B respectively are diagrams for explaining the operation of a rotary erase head of the apparatus shown in FIG. 4 in the long-time and normal speed modes; and FIG. 6 is a plan view showing an essential part of a second embodiment of the helical scan type magnetic recording and/or reproducing apparatus according to the present invention.

DETAILED DESCRIPTION

Figure 1:
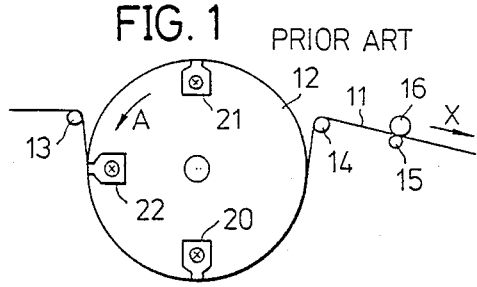
FIG. 1 is a plan view showing an essential part of a conventional helical scan type magnetic recording and/or reproducing apparatus.

First, description will be given with respect to an example of the conventional helical scan type magnetic recording and/or reproducing apparatus (VTR). In FIG. 1, a magnetic tape 11 is wrapped obliquely around an outer peripheral surface of a rotary drum 12 under guidance of guide rollers 13 and 14, and is transported in a direction X by transporting means comprising a capstan 15, a pinch roller 16 and a motor (not shown). The capstan 15 is fixed to a rotary shaft (nor shown) of a motor, and the tape 11 is transported in a state where the tape 11 is pinched between the capstan 15 and the pinch roller 16. The motor is applied with a current in correspondence with a mode of the VTR so that the tape 11 is transported at a speed which is predetermined for the specific mode. Description on the details of the motor and a driving circuit (not shown) thereof will be omitted in the present specification because such as well known to those skilled in the art.

A pair of rotary recording and/or reproducing heads 20 and 21 are mounted diametrically on the rotary drum 12, and a rotary erase head 22 is mounted on the rotary drum at a position equidistant from the two rotary heads 20 and 21. The rotary drum 12 is rotated in a direction A by a drum motor (not shown), and the rotary erase head 22 is mounted at such a position that the rotary erase head 22 lags the rotary head 20 and leads the rotary head 21 in the rotational direction of the rotary drum 12.

Figure 2A:
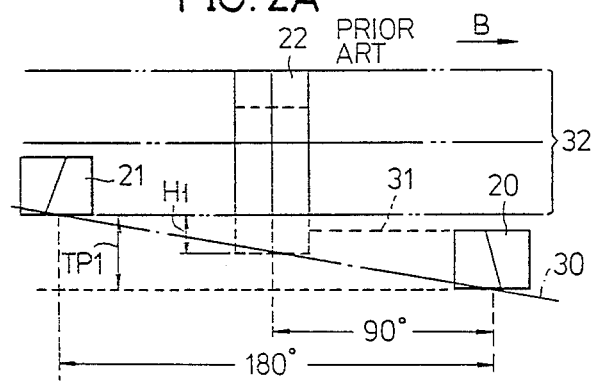
FIGS. 2A and 2B respectively are diagrams for explaining the operation of a rotary erase head of the apparatus shown in FIG. 1 in normal and long-time modes when the rotary erase head is mounted at a position suited for erasure in the normal speed mode.

FIG. 2A shows the relative positonal relationship of the rotary heads 20 and 21 and the rotary erase head 22 for the case where all of the three heads 20, 21 and 22 are positioned so that lower edges thereof lie on a plane 30 indicated by a one-dot chain line. In other words, the three heads 20, 21 and 22 are arranged at the same height position on the rotary drum 12. In FIG. 2A and figures which will be described hereinafter, an arrow B denotes a scanning direction of the heads 20, 21 and 22 with respect to the tape 11. In this case, when the rotary erase head 22 is positioned so that a lower edge thereof lies on the plane 30 as indicated by a phantom line and the recording is carried out in the normal speed mode, a portion of a track 31 which is indicated by a phantom line and is formed by the rotary head 20 will be erased by the rotary erase head 22. For this reason, the rotary erase head 22 is arranged at such a height position that the lower edge thereof is shifted upwardly by a distance H1 from the plane 30, as indicated by a solid line, so as not to erase portions of the tracks which are pre-recorded with information which should not be erased. Since the rotary erase head 22 is arranged at the position equidistant from the two rotary heads 20 and 21 in the plan view of the rotary drum 12, that is, the rotary erase head 22 is separated by an angle of 90° from the two rotary heads 20 and 21, the distance H1 corresponds to one half a track pitch TP1. In FIG. 2A, a guard band is formed between two mutually adjacent tracks formed on the tape 11 in the normal speed mode, and thus, one track pitch TP1 is a sum of a width of the rotary head 20 (and 21) and a width of the guard band. Hence, the rotary erase head 22 erases a track portion 32 having a width of two times the track pitch TP1.

Figure 2B:
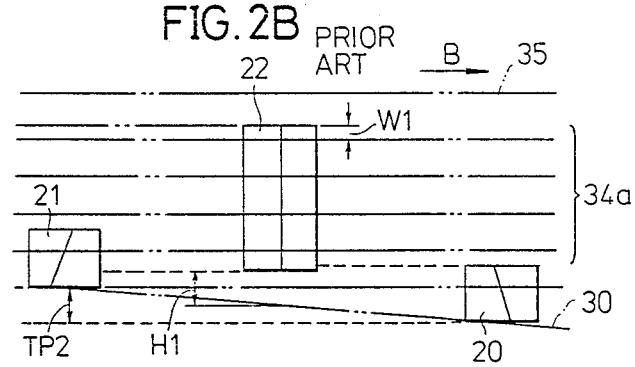

However, when the recording is carried out in a long-time mode with the arrangement indicated by the solid line in FIG. 2A, problems occur. In the long-time mode, the tape 11 is transported at a speed which is slower than that at the time of the normal speed mode. When it is assumed that the tape transporting speed in the long-time mode is one half that at the time of the normal speed mode, a track pitch TP2 becomes one half the track pitch TP1 at the time of the normal speed mode, as shown in FIG. 2B. In this case, the rotary erase head 22 erases a track portion 34a having a width of four times the track pitch TP2, and consequently erases a portion of a width W1 of a pre-recorded track 35 which should not be erased. As a result, there is a problem in that the portion of the pre-recorded track which should not be erased is inevitably erased in the long-time mode.

Figure 3A:
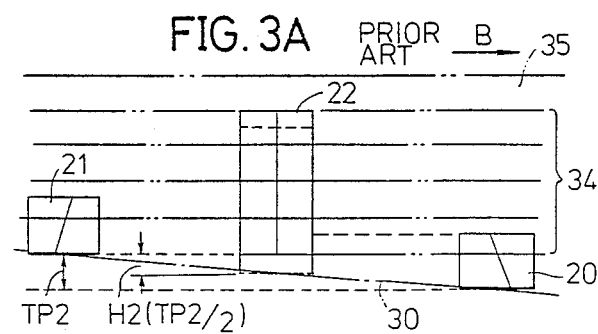

On the other hand, in order to eliminate the above described problem in the long-time mode when the rotary erase head 22 is positioned so that the lower edge thereof lies on the plane 30 as indicated by a phantom line in FIG. 3A, it is possible to arrange the rotary erase head 22 at such a height position that the lower edge thereof is shifted upwardly by a distance H2 which is equal to one half the track pitch TP2 as indicated by a solid line in FIG. 3A. In this case, the rotary erase head 22 erases a track portion 34 having a width of four times the track pitch TP2 and does not erase a portion of the pre-recorded track 35.

However, when the recording is carried out in the normal speed mode with the arrangement indicated by the solid line in FIG. 3A, problems occur. In the normal speed mode, the tape 11 is transported at a speed which is faster than that at the time of the long-time mode. When it is assumed that the tape transporting speed in the normal speed mode is two times that at the time of the long-time mode, the track pitch TP1 becomes twice the track pitch TP2 at the time of the long-time mode, as shown in FIG. 3B. In this case, the rotary erase head 22 erases a track portion 32a having a width of two times the track pitch TP1, and consequently erases a portion of a width W1 of the pre-recorded track 31 which should not be erased because the rotary erase head 22 is arranged at such a height position that the lower edge thereof is shifted downwardly by a distance H3 from the height position where the lower edge of the the rotary erase head 22 should originally be for the normal speed mode. As a result, there is a problem in that the portion of the pre-recorded track which should not be erased is inevitably erased in the normal speed mode.

Therefore, the conventional VTR suffers problems in that the rotary erase head performs a satisfactory erasure only for one of the normal and long-time modes. It is possible to conceive such an arrangement that the height position of the rotary erase head is changed depending on the mode of the VTR, but this arrangement will suffer disadvantages such as complex construction and high cost.

Accordingly, the present invention eliminates the problems of the conventional VTR by setting a mounting position of the rotary erase head on the rotary drum 20 depending on track pitches in track patterns formed during various modes of the VTR and on widths of the rotary recording and/or reproducing heads.

FIG. 4 is a plan view showing a first embodiment of an essential part of the VTR according to the present invention. In FIG. 4, those parts which are the same as those corresponding parts in FIG. 1 are designated by the same reference numerals, and description thereof will be omitted. In FIG. 4, a rotary erase head 40 is mounted on the rotary drum 12 at a position leading the rotary head 21 by an angle $\theta$ in the rotational direction A of the rotary drum 12.

FIGS. 5A and 5B show the relative positional relationship of the rotary heads 20 and 21 and the rotary erase head 40 in the long-time mode and the normal speed mode, respectively. In FIGS. 5A and 5B, those parts which are the same as those corresponding parts in FIGS. 2A, 2B, 3A and 3B are designated by the same reference numerals and reference characters. In the long-time mode in which the tape 11 is transported at a speed which is one half that at the time of the normal speed mode, a portion of the track formed by the rotary head 20 and a portion of the track formed by the rotary head 21 overlap for an overlapping portion of a width W3, and the track pitch TP2 is smaller than a width W of the rotary head 20 (and 21). The rotary erase head 22 erases a track portion 41 having a width of four times the track pitch TP2. In the present embodiment, the rotary erase head 40 is arranged at such a height position that the rotary erase head 40 scans the overlapping portion having the width W3 and consequently erases the track portion 41 having the width of four times the track pitch TP2 from the lower edge of the overlapping portion. In other words, the rotary erase head 40 is arranged at such a height position that the lower edge thereof is shifted upwardly by a distance Ha from the plane 30. As a result, the rotary head 40 scans the track portion 41 which corresponds to four times the track pitch TP2 after the rotary head 20 scans the tape 11 to form a track 42, without scanning a portion of the track 42 which is formed immediately before the track portion 41 nor a portion of a track which is formed immediately after the track portion 41. The distance Ha can be described by the following equation (1) according to the angle $\theta$ and the track pitch TP2 which is determined by the tape transporting speed at the time of the long-time mode.

$$Ha = TP2 \times \theta/180° \quad (1)$$

On the other hand, the tape transporting speed in the normal speed mode is two times that at the time of the long-time mode, and the track pitch TP1 in the normal speed mode is dependent on the tape transporting speed. Furthermore, the track pitch TP1 is greater than the width W of the rotary head 20 (and 21). Thus, a guard band 45 having a width (TP1−W) is formed between a track formed by the rotary head 20 and a track formed by the rotary head 21. The rotary erase head 40 is arranged at such a height position that a track 46 formed by the rotary head 20 will not be erased by the rotary erase head 40 in the normal speed mode. In other words, the rotary erase head 40 is arranged at such a height position that the lower edge thereof shifted upwardly by the distance Ha from the plane 30 coincides with an upper edge of the track 46 formed by the rotary head 20, as shown in FIG. 5B.

From FIG. 3, is can be seen that a sum of the width (TP1−W) and the distance Ha can be obtained from the following equation (2).

$$(TP1-W) + Ha = TP1 \times (\theta/180°) \quad (2)$$

Accordingly, from the equations (1) and (2), it is seen that the angle $\theta$ and the distance Ha can be rewritten as equations (3) and (4), respectively.

$$\theta = 180° \times (TP1-W)/(TP1-TP2) \quad (3)$$

$$Ha = TP2 \times (TP1-W)/(TP1-TP2) \quad (4)$$

Therefore, it is possible to set the mounting position of the rotary erase head 40 so that the rotary erase head 40 can be used in common for the normal and long-time modes of the VTR without introducing the problems described before. The height position of the rotary erase head 40, that is, the distance Ha between the lower edge of the rotary erase head 40 and the plane 30 can be described by the width W of the rotary heads 20 and 21 and the track pitches TP1 and TP2 which are dependent on the tape transporting speed. In addition, the mounting position of the rotary erase head 40 in the plan view of the rotary drum 12 can also be described by the width W of the rotary heads 20 and 21 and the track pitches TP1 and TP2 which are dependent on the tape transporting speed. When the mounting position of the rotary erase head 40 is set according to the equations (3) and (4), the rotary erase head 40 will not erase a portion of the track 46 which is formed by the rotary head 20 which leads the rotary erase head 40 in the normal speed mode, and furthermore, the rotary erase head 40 will erase the overlapping portion of the track 42 formed by the rotary head 20 which leads the rotary erase head 40 and the track which is to be formed immediately after the track 42 by the rotary head 21 which legs the rotary erase head 40. For this reason, although the mounting position of the rotary erase head 40 is fixed, it is possible to perform satisfactory erasure regardless of the mode with which the editing operation is carried out, without erasing portions of pre-recorded tracks pre-recorded with information which should not be erased.

In the present embodiment, only one rotary erase head is provided for the pair of rotary recording and/or reproducing heads. However, it is perfectly possible ot provide one rotary erase head for each of the pair of rotary recording and/or reproducing heads.

FIG. 6 shows a second embodiment of the VTR according to the present invention. In FIG. 6, those parts which are the same as those corresponding parts in FIG. 4 are designated by the same reference numerals, and description thereof will be omitted. In FIG. 6, a rotary erase head 50 is provided in addition to the rotary erase head 40. The rotary erase head 50 is mounted on the rotary drum 12 at a position leading the rotary head 20 by the angle $\theta$, diametrically to the rotary erase head 40. The mounting positions of the two rotary erase heads 40 and 50 are set similarly as described heretofore so as to satisfy the equations (3) and (4) for the angle $\theta$ and the distance Ha, and description thereof will be omitted.

Further, the present invention is not limited to these embodiments, but various variations and modifications may be made without departing from the scope of the present invention.

What is claimed is:

1. A helical scan type magnetic recording and/or redproducing apparatus having a normal speed mode and a long-time mode, said apparatus comprising:
    a rotary drum mounted with first and second rotary magnetic heads at mutually confronting positions;
    transporting means for transporting a magnetic tape which is wrapped obliquely on an outer peripheral surface of the rotary drum for a redetermined angular range greater than 180°, so that said first and second rotary magnetic heads scan along tracks formed obliquely to a longitudinal direction of the magnetic tape, said transporting means transporting the magnetic tape at a first speed in the normal speed mode and transporting the magnetic tape at a second speed in the long-time mode, said first speed being faster than said second speed; and
    at least one rotary erase head mounted on the rotary drum at a position leading said second rotary magnetic head by an angle $\theta$ in a plan view of said rotary drum,
    an overlapping portion being formed in said long-time mode where the angle $\theta$ is described by an equation $\theta = 180° \times (TP1-W)/(TP1-TP2)$ and the predetermined distance Ha is described by an equation $Ha = TP2 \times (TP1-W)/(TP1-TP2)$.

2. A helical scan type magnetic recording and/or reproducing apparatus as claimed in claim 1 in which said second speed is one half said first speed, so that said second track pitch TP2 is one half said first track pitch TP1.

3. A helical scan type magnetic recording and/or reproducing apparatus as claimed in claim 1 in which said rotary erase head has a width which is two times said track pitch TP1.

4. A helical scan type magnetic recording and/or reproducing apparatus having a normal speed mode and a long-time mode, said apparatus comprising:
    a rotary drum mounted with first and second rotary magnetic heads at mutually confronting positions;
    transporting means for transporting a magnetic tape which is wrapped obliquely on an outer peripheral surface of the rotary drum for a predetermined angular range greater than 180°, so that said first and second rotary magnetic heads scan along tracks formed obliquely to a longitudinal direction of the magnetic tape, said transporting means transporting the magnetic tape at a first speed in the normal speed mode and transporting the magnetic tape at a second speed in the long-time mode, said first speed being faster than said second speed;
    one rotary erase head mounted on the rotary drum at a position leading said second rotary magnetic head by an angle $\theta$ in a plan view of said rotary drum; and
    another rotary erase head mounted on the rotary drum at a position leading said first rotary magnetic head by an angle $\theta$ in the plan view of said rotary drum,
    an overlapping portion being formed in said long-time mode as said second rotary magnetic head forms a track which overlaps a portion of a track formed by the first rotary magnetic head which lead said second rotary magnetic head in a rotational direction of said rotary drum;
    another overlapping portion being formed in said long-time mode as said first rotary magnetic head forms a track which overlaps a portion of a track formed by the second rotary magnetic head which leads said first rotary magnetic head in a rotational direction of said rotary drum,
    said rotary erase head having such a height position that said rotary erase head does not scan a track formed by said first rotary magnetic head in said normal speed mode and scans said overlapping portion in said long-time mode,
    said other rotary erase head having such a height position that said other rotary erase head does not scan a track formed by said second rotary magnetic head in said normal speed mode and scans said other overlapping portion in said long-time mode.

* * * * *

UNITED STATES PATENT AND TRADEMARK OFFICE
CERTIFICATE OF CORRECTION

PATENT NO. : 4,757,408
DATED : July 12, 1988
INVENTOR(S) : HIROYUKI UMEDA

It is certified that error appears in the above-identified patent and that said Letters Patent is hereby corrected as shown below:

Column 1, line 63    delete "diting" and substitute therefor ---editing---

Column 2, line 42    delete "thoe" and substitute therefor ---those---

Column 3, line 42    delete "nor" and substitute therefor ---not---

Column 6, line 68    delete "ot" and substitute therefor ---to---

Column 7, line 23    delete "redproducing" and substitute therefor ---reproducing---

Column 7, line 29    delete "redetermined" and substitute therefor ---predetermined---

Column 7, line 43,   after "mode" insert:
---as said second rotary magnetic head forms a track which overlaps a portion of a track formed by the first rotary magnetic head which leads said second rotary magnetic head in a rotational direction of said rotary drum,
    said rotary erase head having such a height position that said rotary erase head does not scan a track formed by said

UNITED STATES PATENT AND TRADEMARK OFFICE
CERTIFICATE OF CORRECTION

PATENT NO. : 4,757,408

DATED : July 12, 1988

INVENTOR(S) : HIROYUKI UMEDA

It is certified that error appears in the above-identified patent and that said Letters Patent is hereby corrected as shown below:

first rotary magnetic head in said normal speed mode and scans said overlapping portion in said long-time mode, said first and second rotary magnetic heads respectively having a width W and forming a first track pattern on the magnetic tape with a first track pitch TP1 in said normal speed mode and forming a second track pattern on the magnetic tape with a second track pitch TP2 in said long-time mode, said second track pitch TP2 being smaller than said first track pitch TP1, said first and second rotary magnetic heads being mounted at such height positions that lower edges of said first and second rotary magnetic heads lie on a single predetermined plane parallel to a rotational plane of said rotary drum, said rotary erase head being mounted at a height position where a lower edge thereof is shifted upwardly of the rotary drum from

UNITED STATES PATENT AND TRADEMARK OFFICE
CERTIFICATE OF CORRECTION

PATENT NO. : 4,757,408

DATED : July 12, 1988

INVENTOR(S) : HIROYUKI UMEDA

It is certified that error appears in the above-identified patent and that said Letters Patent is hereby corrected as shown below:

|  |  |
|---|---|
|  | said predetermined plane by a predetermined distance Ha,--- |
| Column 8, line 33 | delete "lead" and substitute therefor ---leads--- |

Signed and Sealed this

Twelfth Day of February, 1991

*Attest:*

HARRY F. MANBECK, JR.

*Attesting Officer*     *Commissioner of Patents and Trademarks*